United States Patent [19]

DeKlotz et al.

[11] Patent Number: 4,648,028
[45] Date of Patent: Mar. 3, 1987

[54] COLOR ENHANCED DISPLAY FOR A NUMERICAL CONTROL SYSTEM

[75] Inventors: Joseph E. DeKlotz, Earlysville; Thomas E. Manuel; David A. Palmer, both of Charlottesville, Va.

[73] Assignee: General Electric Co., Charlottesville, Va.

[21] Appl. No.: 646,637

[22] Filed: Aug. 31, 1984

[51] Int. Cl.[4] ............................................. G06F 15/00
[52] U.S. Cl. ................................. 364/188; 364/521; 364/474; 340/703; 340/715; 340/734
[58] Field of Search ............... 364/521, 474, 188, 189, 364/191, 192, 171, 146; 340/703, 709, 715, 734

[56] References Cited

U.S. PATENT DOCUMENTS

| | | | |
|---|---|---|---|
| 4,121,283 | 10/1978 | Walker | 340/703 |
| 4,200,867 | 4/1980 | Hill | 340/703 |
| 4,243,984 | 1/1981 | Ackley et al. | 340/703 |
| 4,303,973 | 12/1981 | Williamson | 364/138 |
| 4,396,977 | 8/1983 | Slater et al. | 364/500 |
| 4,413,314 | 11/1983 | Slater et al. | 364/138 |
| 4,521,860 | 6/1985 | Kanematsu | 364/171 |
| 4,524,421 | 6/1985 | Searby et al. | 364/521 |
| 4,570,217 | 2/1986 | Allen et al. | 364/188 |

FOREIGN PATENT DOCUMENTS

WO82/00726  3/1982  PCT Int'l Appl ................ 340/703

Primary Examiner—Jerry Smith
Assistant Examiner—Allen MacDonald
Attorney, Agent, or Firm—Ormand R. Austin

[57] ABSTRACT

Color is added to the standard video display (18) of a computer numerical control system for controlling the operation of a machine tool (10) in the performance of specified operations with respect to a workpiece. Color assignment records (62) are included in the machine setup data (MSD) source file (54) for implementing background color, reverse video color, forms character color, data character color, errors and/or alarm color, operator required response color, and high-lite color. The MSD source file (54) is processed to generate a binary MSD file (56) which is then read into the numerical control basic (NC) software (24) which operates to generate both text and graphic displays. The original or default color assignments may be dynamically modified or changed through an MSD file editor (58). Additionally, the background color and data character color are programmed to change to other colors to bring the operator's attention to an error or alarm condition through the machine control logic (MCL) (28) which generates calls through a software interface (26) to the NC software (24).

21 Claims, 7 Drawing Figures

COLOR ENHANCED DISPLAY FOR A NUMERICAL CONTROL SYSTEM

CROSS REFERENCE TO RELATED APPLICATIONS

This invention is related to the following U.S. patent applications:

Application Ser. No. 415,041, entitled, "Customization Window For A Computer Numerical Control System", filed on Sept. 7, 1982; and U.S. Ser. No. 646,355, entitled, "Graphics Display Generation Method For A Numerical Control System", filed in the names of Joseph E. Deklotz, et al. on Aug. 31, 1984.

These related applications are assigned to the assignee of the present invention and are intended to be incorporated herein by reference.

BACKGROUND OF THE INVENTION

This invention relates generally to computer numerical control systems for machine tools and more particularly to the graphical display of information related to the controlled tool and the machining process.

Numerical control systems for controlling machine tools in accordance with the execution of a digital computer are well known. Such systems control the machining operation in response to one or more part programs which are stored in a memory after having been loaded into the memory by punched tape, for example. Upon demand, the part program directs the machine through a series of fabrication steps. Where, for example, the machine includes a cutting tool, the relative motion between the workpiece and the cutting tool is normally along three mutually perpendicular axes to make a series of straight line or circular cuts in accordance with the part program which dictates the cutting tool motion. Additionally, a computer numerical control (CNC) system may be adapted to control other functions such as tool changes, spindle speed, coolant flow, pallet selection and video graphics and message generation. The number and type of functions vary considerably depending upon the type of machine tool being controlled. In the past, control has been performed by dedicated hardwired circuits which operate in response to sensed conditions on the machine tool and to commands in the part program. More recently, however, the logic associated with machine tool control systems has been implemented in a computerized system by means of a set of stored programs, (i.e., software) to provide the overall control. The software is tailored for a particular application but may be readily modified as required to meet specific needs. The addition of programmable control to a numerical control system provides a number of advantages, the first and foremost is that it is only necessary to reprogram the control to enable it to interface with a particular machine. Additionally, it is relatively easier for the user to program because of the type of instruction set which is employed and the editing features which are available.

A computerized numerical control may include two separate sets of software, namely, the "numerical control logic", termed the NC software, which is more or less fixed in content, and the "machine control logic" termed the MCL program, which is flexible and adaptable for customization to a particular machine tool. In the industry, customization is usually carried out by an original equipment manufacturer (OEM). The NC software controls part making, movement of axes, message display and other auxiliary functions while the MCL program primarily, if not exclusively, controls operation of the machine tool. In the above mentioned application, "Customization Window For A Numerical Control System", there is disclosed, moreover, a software interface, i.e., the customization window, which is comprised of a group of programs, input/output arrays, and status flags that link the NC software, the MCL program and the machine tool. In the related application, "Graphics Display Generation Method For A Numerical Control System", there is disclosed a method implemented in the MCL program for generating graphic displays when a machine tool operator, for example, requests the display of machine status information. A graphic display is provided which is dynamically updated on a periodic basis.

For visually displaying information, both graphic and textual, related to the machine tool and the machining process, a video display unit (cathode ray, CRT) is usually provided. The visual display enables a quick perception, for example, of the machine status. Adding color to the visual display further enhances the effect. A problem with color, however, is that human perception of different colors is variable. What may be a stark contrast for one operator may be essentially no contrast for another. Thus, when the manufacturer of an NC system builds in, and fixes, the display colors, those colors will not in every case be the most effective.

SUMMARY OF THE INVENTION

Accordingly, an object of the present invention is to provide means to allow the color display for a numerical controller to be readily and conveniently customized to the needs of the end-user.

In a preferred embodiment of the invention, color assignment records in the machine set up data (MSD) file provide for implementing background color, reverse video color, forms character color, data character color, error and/or alarm color, operator required response color, and high-lite color. The color assignments may be dynamically modified or changed by the original equipment manufacturer or operator through an MSD file editor. Additionally, the background color and data character color can be programmed to change to bring the operator's attention to an error or alarm condition through the machine control logic (MCL) program which generates calls through a software interface to the numerical control (NC) software where the change is made through routines of the numerical control logic.

BRIEF DESCRIPTION OF THE DRAWINGS

While the present invention is defined in the claims annexed to and forming a part of this specification, a better understanding can be had by reference to the following description when taken in conjunction with the accompanying drawings in which:

DETAILED DESCRIPTION OF THE PREFERRED EMBODIMENT

Figure 1:
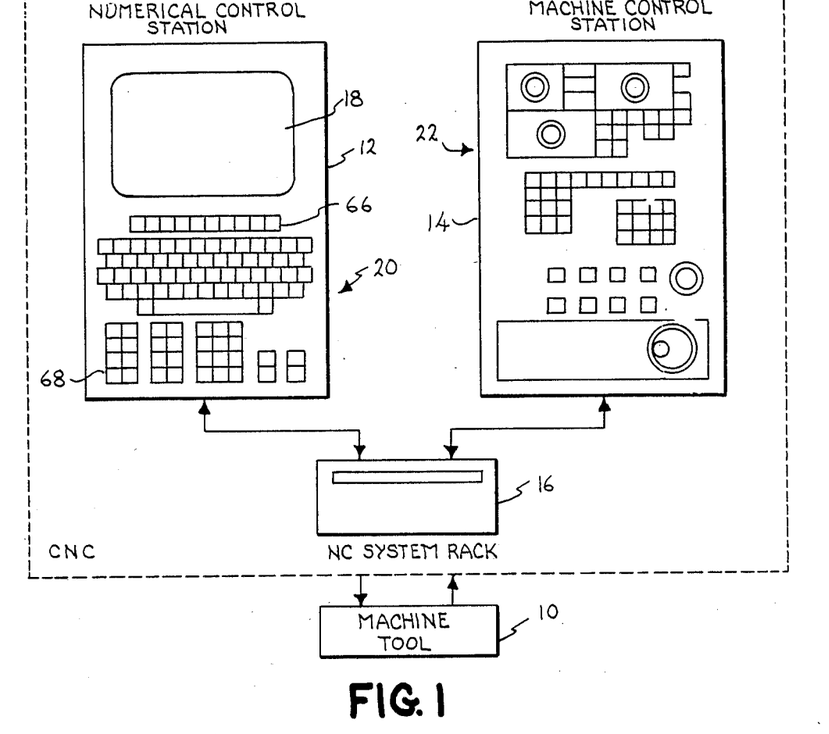
FIG. 1 is a simplified block diagram illustrative of a computerized control system (CNC) for controlling a machine tool.

Referring now to FIG. 1, there is shown, for purposes of illustration, the operational environment for the present invention. In FIG. 1, a computer numerical control (CNC) system controls a machine tool 10 and is comprised of three major hardware components: the numerical control station 12, the machine control station 14 and the NC system rack 16. The computer that controls system operation is located on a circuit board, not shown, in the NC system rack 16. The configuration shown is illustrative of the Mark Century ®2000 computer numerical control system of the General Electric Company. This system is capable of storing entire computer programs and sets of information files, editing the programs and files, and calling them up in a desired sequence for carrying out a complete set of routines that perform a specific task on a machine tool such as a lathe or milling machine.

The numerical control station 12 includes a video monitor 18 including a cathode ray tube (CRT) and a keyboard 20 including special function keys to input files, for example, into memory and thereafter command retrieval of file information for program execution.

The machine control station 14 includes a set of manual controls and push buttons 22 which are utilized for machine oriented operator functions such as mode selection, offset access, joy, spindle speed, feed rate, etc.

Figure 2:
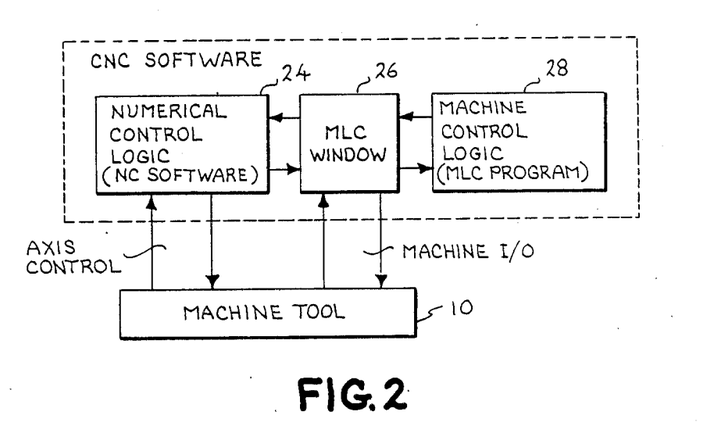
FIG. 2 is a diagram broadly illustrative of the software included in the CNC system shown in FIG. 1.

The functions performed by the controller shown in FIG. 1 are determined by internally stored programs, also referred to as software, which is comprised of three separate sets of programs. Shown in FIG. 2, these programs comprise the numerical control logic 24 (hereinafter referred to as the NC software), the MCL window 26, and the machine control logic 28 (hereinafter referred to as the MCL program). The NC software 24 controls the making of parts, the movement of machine axes, and the display of messages and graphics on the CRT 18. The NC software comprises a fixed or permanent part of the CNC system. THe MCL program specifically controls operation of the machine tool and is comprised of many subprograms, in modular type sections called packages, which allow for user customization by the original equipment manufacturer (OEM). The MCL window 26 comprises a set of software such as disclosed in the above referenced related application Ser. No. 415,041, that permits the MCL program 28 to communicate with the NC software 24 and provides access to the inputs and outputs of the machine tool 10.

Figure 3:
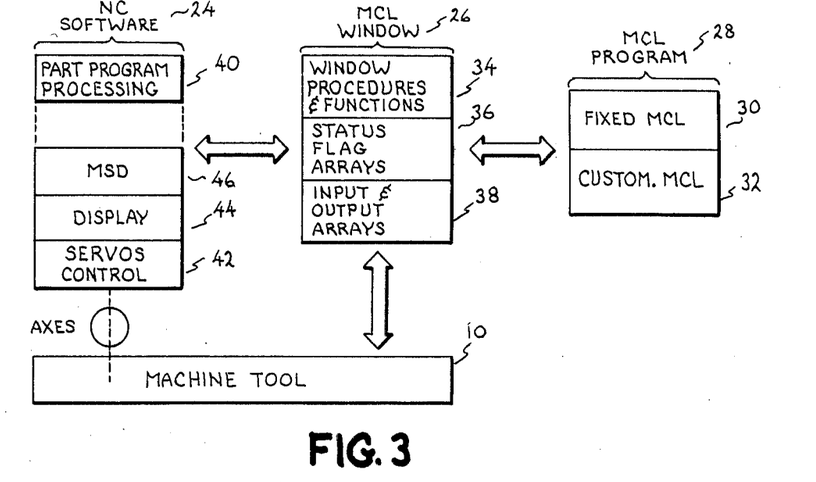
FIG. 3 is a block diagram further illustrative of the CNC software shown in FIG. 2.

As further shown in FIG. 3, the MCL program 28 consists of two parts, the Fixed MCL 30 and the Customization MCL 32. The Customization MCL 32 contains the programs for controlling operation of the machine tool 10 while using the MCL window 26 software to provide the necessary machine interface. It is the Customization MCL 32 that is tailored for a particular type of system operation and to customize the CNC to control a particular machine tool. The Fixed MCL 30, on the other hand, is a set of software whose basic function is to monitor and control the operator devices on the machine control station 14 (FIG. 1) and normally is used as is for most applications.

The MCL window 26 is comprised of a series of window procedures and functions 34, status flag arrays 36 and input and output arrays 38 which normally cannot be changed so that the integrity of the NC software cannot be compromised by any of the user programmable functions and procedures programmed into the MCL 28.

The NC software 24 is comprised of routines for controlling part making 40, axis movement 42 and operator displays 44, as well as providing programs that control spindle motion, timers, math functions and machine setup data. The machine setup data files, shown generally in FIG. 3 by reference numeral 46 are a precisely formulated list of data that supplies the system with such specific machine tool characteristics as feedrates, canned cycles and part program commands. Further, in accordance with this invention, color assignments for six display modes of information, displayed in both alphanumeric and/or graphic form on the CRT 18, are included in the MSD files 46.

With respect to the structure of the files, the control system recognizes files by a "filenames" format. The first three characters name the memory where the file is stored. These are followed by a six character file name and a further identification consisting of one to three characters. A typical filename may be, for example, MB2:MSG.TXT. This example stands for a text type message stored in bubble memory No. 2.

A machine setup data (MSD) source file is comprised of an ordered group of individual records, each up to 80 characters long. The MSD record is in a predetermined syntax format of five basic data elements or data fields, namely: an MSD Table Identifier, MSD Table Index, Access Code Identifier, Parameter Value(s), and Comments. The MSD records are grouped into seven tables as listed below in Table I. Each table, furthermore, has a three letter table identifier.

TABLE I

| TABLE TYPE | TABLE IDENTIFIER |
|---|---|
| 1. Required Data Table | RQD |
| 2. Axis Table | AXS |
| 3. Integer Table | INT |
| 4. Floating Point Table | FLP |
| 5. Boolean Table | BLN |
| 6. Character Table | CHR |
| 7. Canned Cycle Table | CYC |

The parameter location in each table is specified by the Index. The Index is the entry location in the identified table. The Index, i.e., location in the table, is identified with a particular function to be carried out. The specifics of the function, i.e., how the function is to be carried out, are determined by the data type and value of the parameter at the table entry location. This access code simply provides for assigning levels of access protection to the records to prevent unauthorized changes thereto. The parameters of the table are always one of five different types. These data types are: (a) Float—a "floating point" decimal value; (b) Integer—a whole number value without decimal points; (c) Boolean—a true (T) or false (F) value; (d) Character—any alphabetic ASCII character element or a Hyphen; and (e) Enumerated—certain parameters having specific named values, typically PLUS, MINUS, LINEAR or ROTARY, etc. The comment is optional but when utilized, comprises meaningful data elements in the MSD record and is usually set apart from the record by being enclosed in parenthesis.

Figure 4:
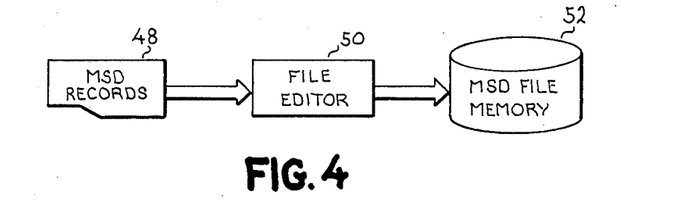
FIG. 4 is a diagram illustrating the manner in which a machine setup (MSD) file is developed.

Referring now to FIG. 4, an MSD file is generated, for example, by a system designer entering a series of MSD records 48 into the CNC system via the keyboard 20 of the numerical control station 12 where they are fed into a conventional file editor 50. There they are transformed into an MSD source file and stored in a memory 52, which may be, for example, a bubble memory. A complete MSD file in memory may be supplied by the manufacturer of the CNC and this file may be used as is. Alternatively, the MSD file may be modified by the user, such as an operator, by means of a separate MSD editor as shown in FIG. 6.

Figure 5:
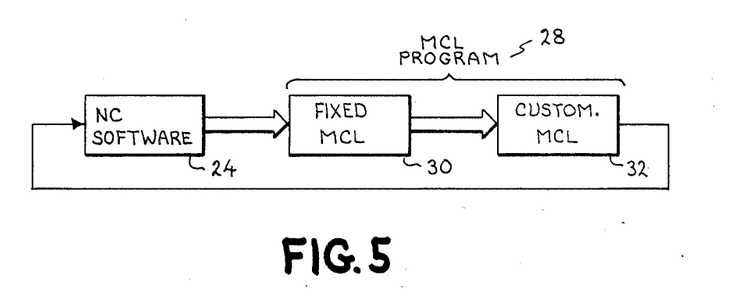
FIG. 5 is a block diagram generally illustrative of the sequence of operation of the CNC software.

Assuming that the CNC software is in place, when the system is powered up, the NC software 24 executes first as shown in FIG. 5 to repeatedly call the MCL program 28 for execution. Each resulting pass through the MCL program 28 is called a sweep and involves "calling" both the Fixed MCL programs 30 and Customization MCL programs 32. The period of time between each MCL sweep depends on the current processing state of the system and what has happened to the inputs received by the CNC from the machine tool 10 through the MCL window 26. The sweep time within the CNC software is primarily on a demand system. Whenever an input from the machine changes or whenever one of the flags from the MCL window 26 changes, a sweep of the MCL occurs. In addition, if a certain period of time is elapsed since the last MCL sweep, a new MCL sweep begins. This means that the MCL program runs at a preset minimum rate but runs faster if activity of the machine tool 10 is high.

Having thus set forth the operational environment, the details of the subject invention can now be considered. Of concern is the display of information on the CRT 18 and the color enhancement of the displays, particularly the dynamic modification of preestablished (default) color assignments by the machine tool operator and a dynamic color modification under control of the MCL program 28 by way of "window calls" to the NC software 24 through the MCL window 26.

Figure 6:
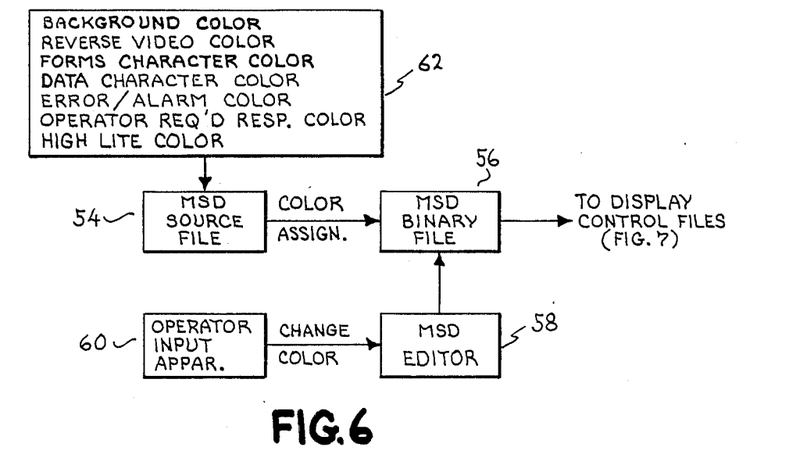
FIG. 6 is a block diagram illustrative of the preferred embodiment of the invention.

Referring to FIG. 6, the MSD source file 54 containing machine setup data records is utilized to first create an MSD binary file 56 via a MSD processing program. The processing program is simply a transformation program to change source code to binary code. The binary MSD file 56 is required for system operation. An interactive MSD editor 58 is included in the system to permit the machine tool user to modify the binary MSD file 56 on demand via input apparatus 60 which can comprise the keyboard 20 of the machine control station 12. In accordance with the invention, eight color assignments in the form of MSD records are programmed into the source file 54 and are located in the Integer Table in the manner referred to above. These records are identified by reference numeral 62 of FIG. 6 and include the following categories: background color, reverse video color, forms (constant data) character color, data character color, errors and/or alarm color, operator required response color, and "high-lite" color. Any one of eight colors consisting of the colors black, blue, green, cyan, red, magenta, amber and white can be assigned to a category in accordance with the following rules: (1) the reverse video color can be the same as the background color but no other category can be the same color as the background, and (2) the reverse video color must not be the same as the data color.

To clarify the relationship between the background, data, and reverse video colors, the following explanation is offered. When an alpha-numeric character is displayed normally, the cell holding the character is in the background color and the character is in the data color. Alternatively, when a character is displayed in reverse video, the cell holding the character is in the data color and the character is in the reverse video color. Thus, if the background color is defined as black, the data color is defined as green and the reverse video is defined as red, a character normally would be displayed in green on a black background. For reverse video, however, the character would be displayed in red on a green background.

Specific or predetermined default color assignments, moreover, are made for the background color, reverse video color, data color and high-lite color with the forms color, the error and alarm color and operator response color selectively enabled to override or "push" a new color over the default data color currently being displayed. Thereafter, the default data color reverts back to i.e. is "popped" back to its previous assignment.

As shown in FIG. 6, the previously programmed color assignments in the MSD source file 54 can be changed by the operator through the use of the MSD editor 58. The operator may modify or change the color assignments on demand as well as the default color definitions. Moreover, a processing procedure operates to transfer binary MSD assignments to the display control system 62 of FIG. 7 after the operator has made any change to the MSD color assignments through the editor 58 via an MSDEDIT program. Thereafter, stored display routines 64 of the NC software 24 generate both text and graphics on the CRT 18 of the numerical control station 12 in a known manner. The implementation of graphics is disclosed in the above reference related application U.S. Ser. No. 646,355.

Figure 7:
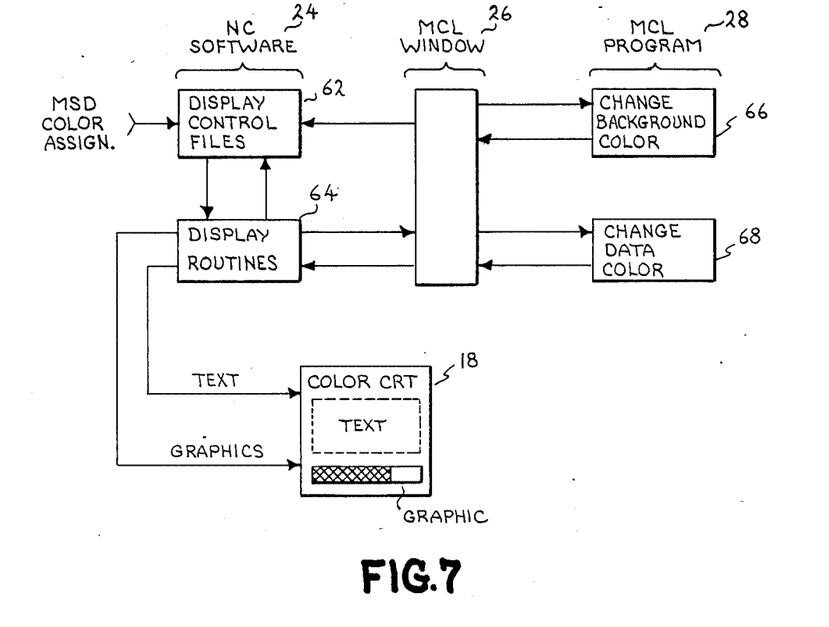
FIG. 7 is a block diagram further illustrative of the preferred embodiment of the invention.

Additionally, the invention provides for modification of the background and data colors in response to operating error or alarm conditions, for example, that are detected by the MCL program 28 for bringing the operator's attention to the error condition so that appropriate action can be taken. As shown in FIG. 7, the MCL program 28 includes two subprograms 66 and 68 which comprise routines residing in the Customization MCL 32 for making window calls to the display control system 62 of the NC software 24 for changing background color and data color, respectively. In such an instance, new color is in effect pushed on top of the previous color whereupon the characters appear in a new color. When the condition is no longer present, the original color is popped back to its original state to restore the preexisting color display of both graphics and text.

While Appendix I includes a program listing for implementing color, Appendix II comprises coding (in PCL language) required for a color enhanced display related, for example, to the spindle speed of a numerically controlled lathe. The graphic pattern is of a bar chart representing spindle speed as a percent of maximum speed with an allowable override. Under normal conditions, the CRT background is black and may include some text material. A bar is depicted in blue such that its length represents full scale spindle speed. At zero spindle speed the bar is thus entirely blue. As the speed begins to increase from zero a portion of the bar representing actual spindle speed increases in length and is shown in cyan. As speed further increases, the cyan portion of the bar chart grows and the blue portion shrinks. The appearance is akin to an analog ribbon mirror. Once the speed is up to a controlled or desired value, the actual speed indicative portion (cyan) turns to green. In case there is an overspeed, the speed indicative portion of the bar turns magenta and the CRT background becomes red to readily catch the operator's attention.

Thus what has been shown and described is a method and means for enabling the CNC software to establish specific colors for a plurality of display modes which may be dynamically modified by either the OEM/user of the system or by the MCL logic software.

While there has been shown and described what is at present considered to be the preferred embodiment of the invention, modifications thereto will readily occur to those skilled in the art. It is not desired, therefore, that the invention be limited to the specific implementation shown and described, but it is intended to cover all modifications, alterations and changes falling within the spirit and scope of the invention as defined in the appended claims.

```
PROCEDURE KGR_CHG_COLOR;
        (         ( COLOR : INTEGER )         )
(****************************************************************
(                                                                )
( DATE OF CODING            : 03/01/84                           )
( PROGRAMMER NAME           : BILL GODDARD                       )
( DESCRIPTION               : BUILDS AN ESCAPE SEQUENCE TO CHANGE THE DATA
(                             COLOR AND SENDS IT TO THE GNCS.    )
(                                                                )
( DEPENDENCIES                                                   )
(   GLOBAL DATA REFERENCES  : KGD_CRT_FILE_CODE                  )
(                             DATA_COLOR_STG, LOCAL TO KGTASK    )
(                                                                )
(****************************************************************
BEGIN
    IF COLOR <> KGD_REVERSE_VIDEO_COLOR THEN        {scr 3750}
        BEGIN
        DATA_COLOR_STG[3] := CHR( COLOR + 16*30 );  {scr 3950}
        Ksr_PUTSTR( DATA_COLOR_STG );
        END
END;
                                                    {end scr 3629}

PROCEDURE ADD_COLOR_PATTERN( COLOR   : INTEGER;
                             PATTERN : INTEGER );
(****************************************************************
(                                                                )
( DATE OF CODING            : 03/01/84                           )
( PROGRAMMER NAME           : BILL GODDARD                       )
( DESCRIPTION               : ADDS COLOR AND PATTERN TO GRAPHICS_SEQ.  COLOR
(                             AND PATTERN ARE ENCODED INTO ONE BYTE AS:
(                                                                )
(                             | 1 | 2 | 3 | 4 | 5 | 6 | 7 | 8 |
(                             | 1 |   color  |    pattern    |
(                                                                )
( DEPENDENCIES                                                   )
(   GLOBAL DATA REFERENCES  : GRAPHICS_SEQ, LOCAL TO KGTASK      )
(                                                                )
(****************************************************************
BEGIN
    GRAPHICS_SEQ.LEN := GRAPHICS_SEQ.LEN + 1;
    GRAPHICS_SEQ[ GRAPHICS_SEQ.LEN ] := CHR( 128 + COLOR * 16 + PATTERN );
END;

PROCEDURE KGR_CHG_BACKGROUND;
        (         ( COLOR : INTEGER )         )
(****************************************************************
(                                                                )
( DATE OF CODING            : 03/01/84                           )
( PROGRAMMER NAME           : BILL GODDARD                       )
( DESCRIPTION               : BUILDS AN ESCAPE SEQUENCE TO CHANGE THE
(                             BACKGROUND COLOR AND SENDS IT TO THE GNCS.
(                                                                )
( DEPENDENCIES                                                   )
(   GLOBAL DATA REFERENCES  : KGD_CRT_FILE_CODE                  )
(                             BACKGROUND_COLOR_STG, LOCAL TO KGTASK
(                                                                )
(****************************************************************
```

```
BEGIN
    IF COLOR <> KSD_ERROR_OR_ALARM_COLOR THEN              {scr 3950}
        BEGIN
            BACKGROUND_COLOR_STG[3] := CHR( COLOR + 16#30 );    {scr 3950}
            Ksr_PUTSTR( BACKGROUND_COLOR_STG );
        END
END;
                                                           {end scr 3629}

{Items 59-65 are for color graphics.}
            {}
{3558}                      BACKGROUND..HI_LITE:
            {}
            {The all zero check is necessary to ensure compatibility of}
            {this MSD processing with MSD files in the field. If this  }
            {processing is used with an MSD file that has no color     }
            {items defined in it then no error messages will be produc-}
            {ed by MSD processing. Likewise, if a user inputs all zeros}
            {for the color items then this will set by us. The second  }
            {point is the responsibility of the color graphics system  }
            {to catch.                                                 }
            {}
            BEGIN {Case portion for color graphics items.}
                IF (COUNT = BACKGROUND) THEN
                    BEGIN {See if all zeros.}
                        ALL_ZERO := TRUE;
                        FOR I := BACKGROUND TO HI_LITE DO
                    IF (INTEGER_TABLE[I] <> 0) THEN ALL_ZERO := FALSE;
                    END; {If this is the background color.}
                IF NOT ALL_ZERO THEN
                    BEGIN {User has values in his MSD.}
                        IF (INTEGER_TABLE[COUNT] < LO_COLOR_CODE) OR
                           (INTEGER_TABLE[COUNT] > HI_COLOR_CODE) THEN
                            ERROR_NUM := 2488
                        ELSE {Color code is in legal range}
                            IF (COUNT = REV_VIDEO) THEN
                                BEGIN {Reverse video can not be same as data color.}
                                IF (INTEGER_TABLE[REV_VIDEO] = INTEGER_TABLE[DATA_COL]) THEN
                                    ERROR_NUM := 2487;
                                END
                            ELSE {This is not reverse video.}
                                BEGIN
                                    {No color except reverse video can be same}
                                    {as the background color.                 }
                                    IF (INTEGER_TABLE[COUNT] = INTEGER_TABLE[BACKGROUND])
                                       AND (COUNT <> BACKGROUND) THEN
                                        ERROR_NUM := 2486;
                                END; {If this not the reverse video color.}
                    END; {If all zero values.}
{<3558}      END; {Case portion for color graphics items.}
```

APPENDIX II

```
IF ACTIVE_DISP_PAGE=90 THEN
    XCURSOR := TRUNC((PROG_S * NC_SSO_VALUE)/10.0);
    IF XCURSOR > 420 THEN                -- MAX MSD ALLOWABLE SPINDLE = 4000
        XCURSOR := 420;                  -- 20% OVERRIDE = 4200
    ELSIF XCURSOR <= 0 THEN
        XCURSOR := 1;
    END IF;

IF (XCURSOR < 226) THEN
        DRAW_MOVE(60,120);               -- DISPLAY GRAPH = CYAN (UNDER SPEED)
        DRAW_RECTANGLE(XCURSOR,95,3,8);
        DRAW_MOVE(XCURSOR,120);
        DRAW_RECTANGLE(461,95,1,8);

ELSIF ((XCURSOR > 225) AND (XCURSOR < 376)) THEN
        DRAW_MOVE(60,120);               -- DISPLAY GRAPH = GREEN
        DRAW_RECTANGLE(XCURSOR,95,2,8);
        DRAW_MOVE(XCURSOR,120);
        DRAW_RECTANGLE(461,95,1,8);
```

```
ELSIF (XCURSOR > 375) THEN
    DRAW_MOVE(60,120);              -- DISPLAY GRAPH = MAGENTA (OVER SPEED)
    DRAW_RECTANGLE(XCURSOR,95,5,8);
    DRAW_MOVE(XCURSOR,120);
    DRAW_RECTANGLE(461,95,1,8);
    CHANGE_BACKGRND( 4);  --RED BACKGROUND, SPINDLE OUT OF RANGE
   END IF;
END IF;
```

We claim:

1. A method of enhancing the visual display of a computer numerical control machining system by the addition of color thereto, comprising the steps of:
   (a) generating and entering color assignment records in a stored machine set up data (MSD) source file containing data for the generation of a visual display of predetermined information relating to system operation;
   (b) processing said records of said source file and generating therefrom an MSD binary file;
   (c) transferring color assignment data from said MSD binary file to a display control system;
   (d) generating a visual display in color in response to signals generated by processing said display control file; and
   (e) modifying the color assignment data in accordance with changing conditions of the numerical control system.

2. The method as defined by claim 1 and additionally including the step of modifying said MSD binary files by an operator on demand prior to said step of transferring.

3. The method as defined by claim 2 and additionally including the step of modifying said MSD binary file by entering new color assignment records into a file editor coupled to said MSD binary file, said editor operating to generate modified usable stored data files which are thereafter entered into the MSD binary file and thereafter transferred to said display control system.

4. The method as defined by claim 1 wherein the step of modifying color assignment data is in response to predetermined detected operating conditions of the machining system.

5. The method of claim 4 wherein said machining system operates in accordance with an executed routine of a machine control logic program and wherein said step of modifying said color assignment data comprises modifying color assignment data by system operation error routines of the machines control logic program.

6. The method as defined by claim 4 and wherein said step of generating and entering color assignment records includes color assignment records for background color, reverse video color, forms character color, data character color, errors and alarms color, operated required response color and high-lite color.

7. The method as defined by claim 6 and additionally including the step of modifying said color assignments on demand by an operator.

8. The method as defined by claim 7 and wherein said step of generating and entering color assignment records further comprises establishing specific default colors for the data color, the background color, reverse video color and high-lite color.

9. The method as defined by claim 8 and additionally including the step of selectively overriding the default data character color with the forms character color, the error and alarm character color and the operator required response color and thereafter reverting back to the default color assignment of the data character color.

10. The method as defined by claim 6 and additionally including the step of changing background color and data character color in response to a predetermined sensed system operating condition and thereafter reverting back to their previously assigned colors when said condition is no longer present.

11. The method as defined by claim 10 wherein said system operates in accordance with a plurality of stored computer programs and data files including the numerical control logic software and the machine control logic program and being coupled together through a software interface, and
   wherein said step of changing the background color and data character color in response to sensed system operating condition comprises executing calls from the machine control logic software to the display control file included in the numerical control logic program through said interface.

12. A system for adding color to the video display of a computer numerical control machining system, comprising:
   a first data file containing color assignment records for the generation of color displays of predetermined information relating to system operation;
   means for processing said records of said first data file and generating therefrom a second data file in machine usable form;
   means for transferring color assignment record data from said second data file to a display control system;
   means for generating a visual display in color in response to said video display producing signals; and
   means for modifying the color assignment data in accordance with changing conditions of the computer numerical control machining system.

13. The method as defined by claim 12 and additionally including means for modifying said second data file by an operator.

14. The system as defined by claim 12 wherein said means for modifying color assignment data is adapted to respond to predetermined sensed operating conditions of the machining system.

15. The method of claim 14 wherein said machining system operates in accordance with executed routines of a machine control logic program and wherein said means for modifying said color assignment data comprises modifying color assignment data by system operation error routines of the machine control logic program.

16. The system as defined by claim 12 wherein said first data file comprises a machine setup data source file and said second data file comprises a machine setup data binary file and additionally including a file editor coupled to said machine setup data binary file, said file editor being operable to generate modified usable stored data files.

17. The system as defined by claim 12 and wherein color assignment records include color assignment records for background color, reverse video color, forms character color, data character color, errors and alarms color, operated required response color and high-lite color.

18. The system as defined by claim 17 and wherein said color assignment records for the data color, the background color, reverse video color and high-lite color are defined in predetermined default colors.

19. The system as defined by claim 18 and additionally including means for selectively overriding the default data character color with the forms character color, the error and alarm character color and the operator required response color and thereafter reverting back to the default color assignment of the default data character color.

20. The system as defined by claim 12 and additionally including means for changing background color and data character color in response to a predetermined sensed system operating condition and thereafter reverting back to their previously assigned colors when said condition is no longer present.

21. The system as defined by claim 20 wherein said system further comprises a plurality of stored computer programs and data files including the numerical control logic software and the machine control logic program and being coupled together through a software interface, and wherein said means for changing the background color and data character color in response to sensed system operating condition includes means for executing calls from the machine control logic software to the numerical control logic program through said interface.

* * * * *